(12) United States Patent
Jackson

(10) Patent No.: US 8,634,858 B1
(45) Date of Patent: Jan. 21, 2014

(54) LOCATION BASED STATUS UPDATES

(75) Inventor: Dean Kenneth Jackson, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/283,191

(22) Filed: Oct. 27, 2011

(51) Int. Cl.
*H04W 24/00* (2009.01)
*H04B 7/00* (2006.01)
*G06F 15/16* (2006.01)

(52) U.S. Cl.
USPC ............... 455/456.3; 455/456.1; 455/41.2; 709/206; 709/201; 709/203; 709/207

(58) Field of Classification Search
USPC ....................................... 455/456.3
See application file for complete search history.

(56) References Cited

U.S. PATENT DOCUMENTS

| | | | |
|---|---|---|---|
| 7,383,316 B2 | 6/2008 | Koch et al. | |
| 7,823,073 B2 | 10/2010 | Holmes et al. | |
| 7,941,130 B2 | 5/2011 | Moton, Jr. et al. | |
| 2002/0095486 A1* | 7/2002 | Bahl | 709/223 |
| 2005/0068169 A1* | 3/2005 | Copley et al. | 340/539.13 |
| 2009/0305632 A1* | 12/2009 | Sarkissian et al. | 455/41.2 |
| 2011/0106898 A1 | 5/2011 | Granito et al. | |
| 2011/0117927 A1* | 5/2011 | Doyle | 455/456.1 |
| 2011/0185006 A1* | 7/2011 | Raghav et al. | 709/201 |
| 2012/0270559 A1* | 10/2012 | Ingerson | 455/456.1 |

\* cited by examiner

*Primary Examiner* — Timothy Pham
(74) *Attorney, Agent, or Firm* — Shumaker & Sieffert, P.A.

(57) ABSTRACT

A method is disclosed for updating an availability indicator of a user associated with a communications device. The method includes receiving a first location signal from a mobile device indicative of the location of the user and determining the user's position relative to the communications device based on the location signal. The availability indicator is updated to one of a first state or a second state based on the user's determined position. In one embodiment, the first state indicates that the user is available at the communications device, and the second state indicates that the user is away from the communications device.

12 Claims, 5 Drawing Sheets

LOCATION BASED STATUS UPDATES

TECHNICAL FIELD

The disclosure relates generally to the field of messaging systems and specifically to updating a user's availability status based on signals indicating the location of the user.

BACKGROUND

Messaging systems have been developed that track a user's availability status based on the user's use of the device. Tracking the user's availability status includes, for example, tracking that the user has logged into a message communication device, has been using the messaging application on the device, or has been using other applications on the device. As an example implementation, the message communication device can determine that the user is available if the user has activated the device. The device can further, as part of the status tracking process, continue to consider the user to be available until the user has not used the device for a particular period of time, or until the user logs off.

Message communication devices are linked to other message communication devices through networks. Generally, in order to facilitate real time communication, message communication devices that track user availability status also make the status accessible to other linked devices. In this manner, the user of one device can know that the user of another device is available to receive messages.

SUMMARY

Disclosed herein are methods and systems for making availability status updates for users of messaging systems, based on signals indicating the location of the user. One aspect of the embodiments taught herein is a method for updating an availability indicator of a user associated with a communication device. The method includes receiving a location signal indicative of the location of the user. The user's position is then determined relative to the communications device based on the location signal. The availability indicator is updated based on the user's determined position.

Another aspect of the embodiments taught herein is a method for updating an availability indicator of a user associated with a communication device. The method includes receiving a first location signal from a mobile device indicative of the location of the user and determining the user's position relative to the communications device based on the location signal. The availability indicator is updated to one of a first state or a second state based on the user's determined position. The first state indicates that the user is available at the communications device, and the second state indicates that the user is away from the communications device.

Another aspect of the disclosed embodiments is an apparatus for updating an availability indicator of user associated with a communication device that is remote from the apparatus. The apparatus includes a memory and at least one processor. An availability indicator is stored at the memory. The processor is in communication with the memory and is operable to receive information indicative of the location of the user and determine the user's position relative to the communications device based on the location signal. The processor updates the availability indicator in memory based on the user's determined position.

BRIEF DESCRIPTION OF THE DRAWINGS

The various features, advantages and other uses of the present disclosure will become more apparent by referring to the following detailed description and drawings in which.

DETAILED DESCRIPTION

Many message communication devices track the availability status of users. Tracking availability status includes tracking such activities as whether the user is logged in or logged out of the message communication device, whether the user is using the messaging application on the device, and whether the user is using any other application on the device. As an example, the message communication device could determine that a user is present if the user has logged into the device, and the screen saver has not been subsequently activated.

Sometimes, however, the availability status determination can be inaccurate or become out of date. For example, a user may forget to logoff when the user leaves the message communication device. In this instance, the computer system will continue to indicate that the user is available although the user has stepped away from the device. As another example, if the user has not used the device for a particular period of time, the screen saver could be activated, and the system could indicate that the user is unavailable, even though the user is present at the device.

In the embodiment disclosed herein, tracking the availability status of a user of a message communication device can be implemented by using the location of the user as a component in the availability determination. The location of the user can be inferred from signals received from location devices such as mobile telephones carried by the user and cameras associated with the message communication system.

The disclosure herein is directed to methods and systems wherein information indicative of the location of the user received from a location device can be utilized by the message communication device to update the user's availability status.

Figure 1:
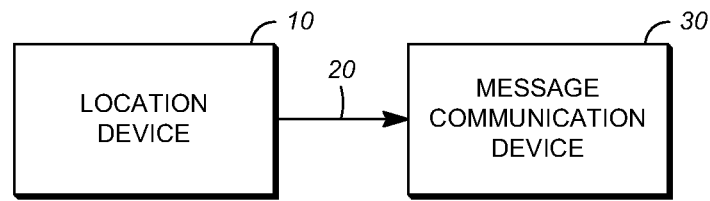
FIG. 1 is a block diagram of a message communication device including location based availability updates.

FIG. 1 shows a location device 10 that provides a location signal 20 to a message communication device 30 to implement location based availability status updates. As will be explained herein, the communication device 30 is associated with the user and has a physical location. The device 30 is operable to determine whether the user is in a position proximate the device 30 based on the location signal 20.

The location device 10 can be any device that can provide location information that represents the location of the user. As an example, the location device 10 can be a mobile telephony device such as a mobile telephone or a telephony enabled laptop or tablet computer that is carried by the user and is operable to detect and transmit its location. Other devices that are carried by or associated with the user and are operable to track location, such as pagers, GPS units, OnStar units, etc. can also be location devices 10.

The location device 10 can also be a sensing device such as a camera that is electrically connected to the device 30, has a field of vision that is able to capture an image of the user when the user is physically present at the device 30, and outputs the location signal 20 in the form of a photograph or video signal. Other types of sensors such as infrared detectors, ultrasonic detectors and microphones that detect generally the presence of persons could be used as location devices 10. The location device 10 is not limited to the examples above and can be any device that is operable to provide location information indicating the physical location of the user of the device 30.

The location data that is encoded in the location signal 20 can include many different types of information that indicate the physical location of the user, or from which the physical location of the user can be inferred. The location signal 20 can include, for example, the physical location of the location device 10, given in the form of global coordinates. The location information can include, for example, physical address information, which in some embodiments can include the name of a place, a business, a restaurant, or a particular building, where the location device 10 is located. In some cases the physical address information can be provided by the user or by a check-in service. The location information can also include an indication that the user is not in a given location; as for example, if a camera determines that the user is no longer in a position to effectively utilize the device 30 for message communication. The location signal 20 is not limited to the examples above, and can provide any type of location information that indicates directly or indirectly the location of the user.

The location signal 20 can be output directly from the location device 10. As will be discussed below, the location signal 20 can also be output from a location server that receives location information from one or more location devices 10, and based on this data, determines and outputs the location signal 20. Thus, the location signal 20 can be received by the device 30 from the location device 10 either directly or indirectly.

The device 30 in this embodiment is operable to track the availability status of a user. The device 30 can be implemented using a single conventional computer or multiple conventional computers that are configured to perform the functions described herein. These functions are performed using software that is provided to and executed by the device 30.

Figure 2:
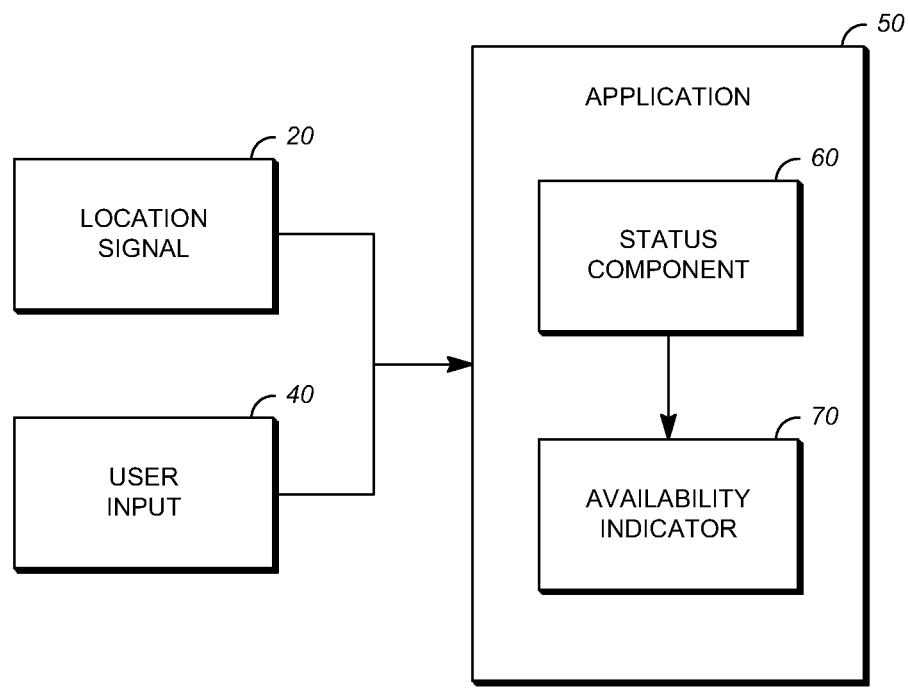
FIG. 2 is a diagram illustrating a system for location based availability status updates.

FIG. 2 shows the operation of a system for location based availability status updates in the form of an application 50 that is executed by the device 30. The application 50 includes a status component 60 that updates an availability indicator 70. Availability indicator 70 is implemented as a location in memory that can hold a value (such as 1 or 0) indicative of the state of the availability indicator.

The application 50 can be any computer based application that tracks the availability status of the user. The application 50 receives the location signal 20 and a user input 40 as inputs.

Status component 60 is part of application 50 and can be configured to determine the availability indicator 70 of the user of the application 50 or the device 30. The status component 60 receives as inputs the location signal 20 and the user input 40. Based on these inputs, the status component 60 determines and stores the availability status of the user in availability indicator 70.

The availability indicator 70 stores the availability status of the user of application 50 or system 30. For example, the availability indicator 70 can have an available state indicating that the user is in a position proximate the device 30, and an unavailable state indicating that the user is not in a position proximate the device 30. The available state can correspond to descriptions such as "online" or "present" for example, while the unavailable state can correspond to descriptions such as "offline" and "away" for example. Additional or different indicators of the user's availability can also be stored in the availability indicator 70.

The status component 60 can update the availability indicator 70 of the user based on the location signal 20. The rules for determining the availability status of the user can be specific for the application 50, or generalized rules for the device 30. For example, the status component 60 can determine that the user is available, based on the user being logged into the device 30 and the location signal 20 indicating that the user is proximate the device 30. The status component 60 can change the availability indicator 70 from the available state to the unavailable state if the location signal 20 indicates that the user is no longer proximate the device 30. For example, if the availability indicator 70 is set to available and the location signal 20 indicates that the user is greater than a predetermined distance away from the device 30, the status component 60 can change the availability indicator 70 to unavailable.

The availability status of the user can be based on many other location criteria, such as indications that the user is or is not within; a room, a building, the range of sight of a camera, or any other defined area.

The application 50 can also update the activity status of a user based on the user input 40. User input 40 can be any information intentionally provided by the user of device 30, or information concerning actions taken by the user while using device 30. For example, the user input 40 can be in the form of instructions from the user, such as the instruction from the user to show the user as not available, or the instruction to show the user as available, if the status component 60 determines, based on a location signal 20, that the user is proximate the device 30. Also, the user input 40 can be, for example, the information that the user has logged into or logged out of the device 30, or that the user has recently activated or interacted with application 50 or any other application on the device 30.

The user input 40 can be used by the status component 60 as additional information relevant to determining the availability indicator 70. As an example, the user could instruct the application 50 to update the availability indicator 70 to available if the user status was unavailable and the user returns to within a predetermined distance of the device 30 and is therefore again proximate the device 30.

The device 30 can transmit the availability indicator 70 to one or more other users. The other users can be users of the device 30, or users of other devices that are connected to the device 30 through a network either by a peer-to-peer connection or by way of a server.

Figure 3:
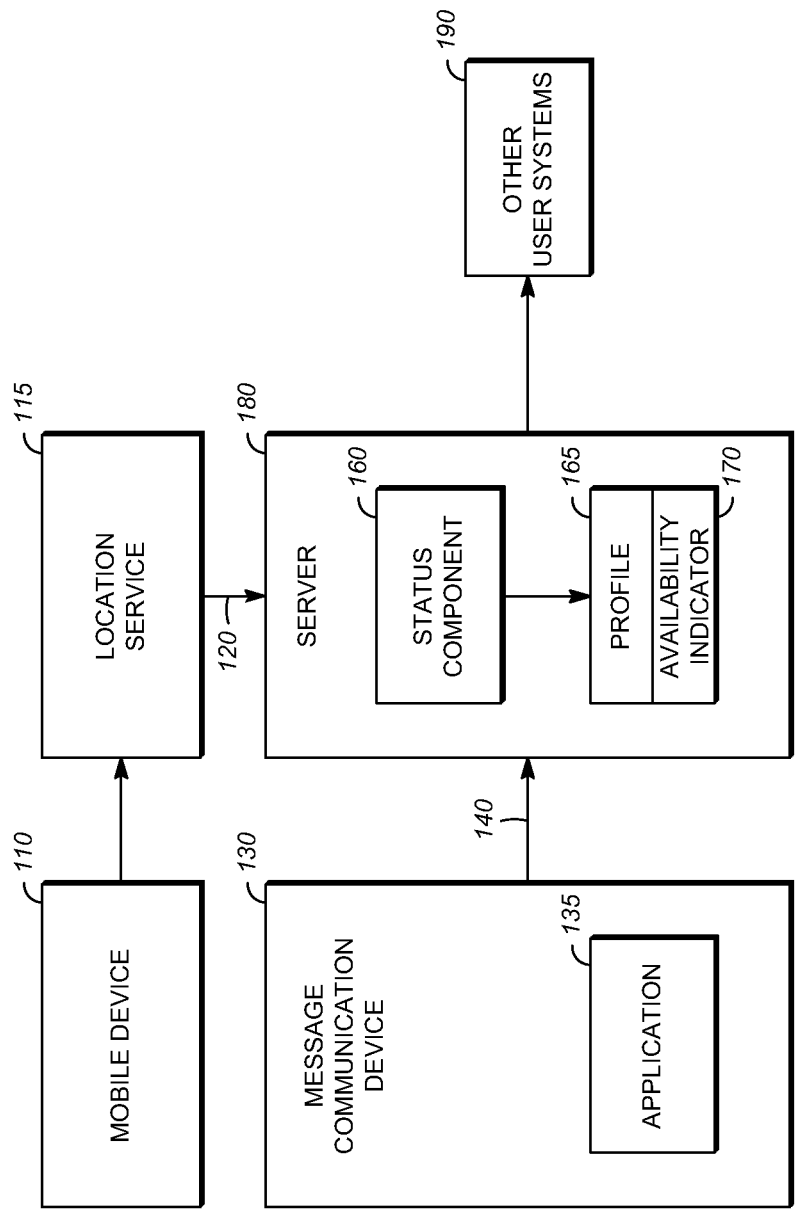
FIG. 3 is a block diagram showing a message communication device including location based availability status updates implemented in a client-server environment.

The block diagram in FIG. 3 shows a client-server environment for implementing location based status updates that indicate whether a user is available at a message communication device 130 that is provided with application 135. A server 180 includes a status component 160. The status component 160 determines and updates an availability indicator 170 that is associated with a profile 165 based on a location signal 120 and a user input 140. The location signal 120 is received from a location service 115 based on the physical location of a mobile device 110. The user input 140 is received from the application 135. The server 180 is operable to transmit the availability indicator 170 to one or more other user systems 190 that are associated with other users or entities that are using the application 135 to communicate with the user of the user communication device 130.

The user communication device 130 is a computer that can be used by an individual user. The user device 130 has a physical location and includes an application 135. The application 135 is part of the user device 130. The application 135 is implemented in software and is operable to supply the functionality of a messaging application such as a chat program, an instant messaging program, or other program that allows users of the messaging application to exchange messages in real time. For example, the application 135 can provide chat windows that allow users to track a conversation that they are conducting over the messaging system, conduct multiple conversations with different users in multiple windows simultaneously, build chat rooms where multiple users of the messaging system can exchange messages with all other attendees of the chat room, and other similar types of functions. The application 135 will typically also allow users to select other users of the messaging system (such as through contact lists) that are eligible to receive status information, such as the availability indicator 170, and to transmit or otherwise make available the availability indicator 170 to these other users.

The application 135 is further operable to provide user input 140 to the server 180. User input 140 can be any information intentionally provided by the user of the device 130, or information concerning actions taken by the user while using the user device 130. For example, the user input 140 can be the instruction to set the availability indicator 170 to "online" or "offline" or "away". The user input 140 can also be a conditional instruction. For example, the user input 140 could be the instruction for the status component 160 to identify the user as available, if the status component 160 determines, based on a location signal 120, that the user is proximate the user system 130 after having been away.

The mobile device 110 is a device that is typically carried by the user and is operable to provide information about its physical location. Accordingly, the physical location of the user can be inferred from the physical location of the mobile device 110. For example, the mobile device 110 can be a mobile telephone that is operable to detect and transmit location information. Any other device that can detect and transmit location information can be used as the mobile device 110, such as a tablet computer or a laptop computer. The mobile device 110 provides the location signal 120 to the server using the location service 115.

The location service 115 is configured to generate the location signal 120 and transmit the location signal 120 to the server 180. The location service 115 receives the location information from the mobile device 110. For example, the location information can be received from a location subsystem of the mobile device 110. Based on the location information, the location service 115 performs any or all of the functions of generating the location signal 120, storing the location signal 120, transmitting the location signal 120 and other related functions. As an example, the location service 115 can periodically receive location information from the mobile device 110, track the location of the mobile device 110, generate a location signal 120 based on the location information, and relay the location signal 120 to server 180 upon receiving a request. The location service 115 can be a portion of the mobile device 110, in the form of software executed by the mobile device 110. Alternatively, the location service 115 can be implemented by a location server that receives location information from the mobile device 110.

The location signal 120 includes location information associated with the user of the user device 130, such as the location of the mobile device 110 associated with the user. The location signal 120 can include global coordinates representing the location of the mobile device 110. The location signal 120 can also include physical address information. For example, physical address information can include the name of a place, a business, a restaurant, or a particular building, where the location device 110 is located. The physical address information can be provided by the user or a check-in service. Many other types of location information can be included in the location signal 120.

The server 180 includes the status component 160, the profile 165 and the availability indicator 170. The server 180 receives the user input 140 from the device 130 and the location signal 120 from the location service 115. In addition, the server can transmit the availability indicator 170 to one or more other user systems 190 that are used by one or more other users.

The status component 160 can be provided in the form of software that is executed by the server 180. The status component 160 receives the location signal 120 and the user input 140 as inputs. Based on these inputs, the status component 160 can determine and store the user's availability status in the availability indicator 170. For example, the status component 160 can determine that the user of user device 130 is available if the user is logged into the user device 130 and the location signal 120 indicates that the user is proximate user device 130. As another example, the status component 160 could determine the distance between the physical location of the mobile device 110 and the physical location of the user device 130 and determine that the user is not proximate the user device 130 if the distance is greater than a threshold, where the threshold is a predetermined distance.

The availability indicator 170 stores the availability status of the user of message communication device 130. For example, the availability indicator 170 can have an available state indicating that the user is proximate the user device 130, and an unavailable state indicating that the user is not proximate the user device 130. The status component 160 can also support commands from the user, and, for example, place the availability indicator 170 into the unavailable state, while the mobile device 110 is proximate the user device 130, based on an override command.

The profile 165 is associated with and can be used to store information concerning the user of device 130. The information contained in the profile 165 can include rules for determining the availability indicator 170 associated with the user. As an example, the profile 165 can contain the instruction that the status component 160 change the availability indicator 170 to available when the user is proximate the user device 130 and the availability indicator 170 is in the unavailable state.

Other user systems 190 can include other messaging systems connected directly to the server 180, and messaging systems that are connected indirectly to the server 180 through a network. As an example implementation of the user communication device 130 in a client-server environment, the server 180 can store an availability indicator 170 indicative of the availability of the user of user device 130. The availability indicator 170 can have an available state and an unavailable state. The server 180 can receive a location signal 120 from the location service 115 that indicates the physical location of the mobile device 110. Based on the location signal 120, the status component 160 of the server 180 can change the availability indicator 170 to the unavailable state if the availability indicator 170 is in the available state and the location signal 120 indicates that the user is not proximate the user device 130. The server 180 can transmit the availability indicator 170 to other users 190.

Figure 4:
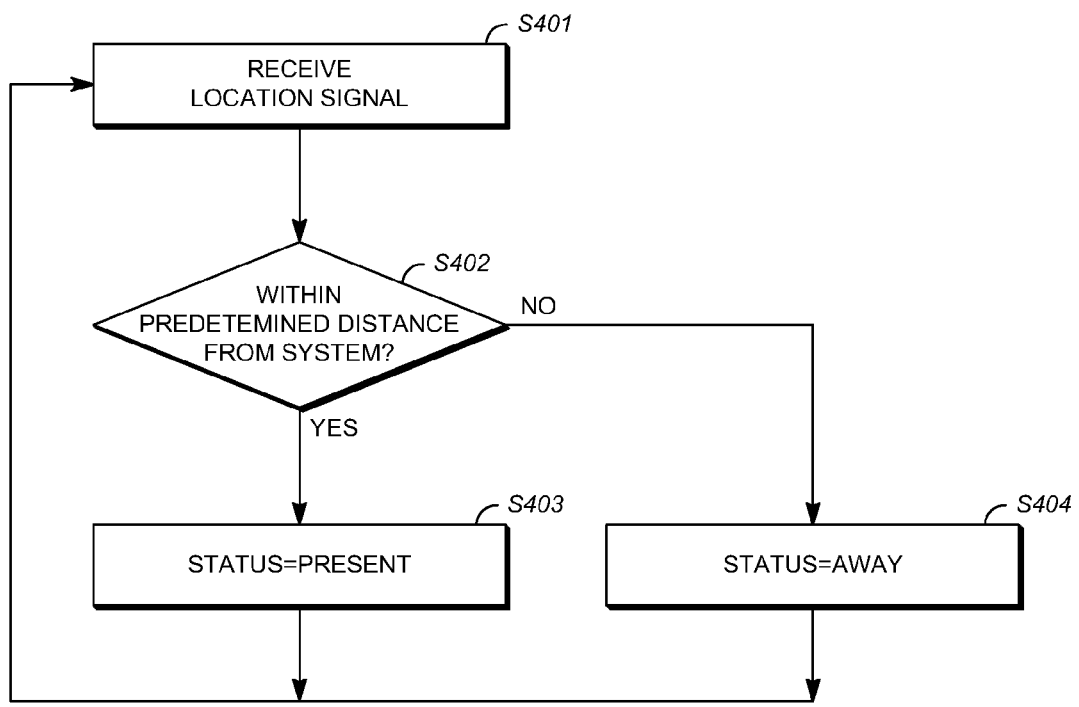
FIG. 4 is a flowchart showing a process for location based status updates.

The flow chart in FIG. 4 shows a process for changing the availability status of a user of a message communication device based on receiving location information representing the location of the user. The message communication device, for example, can be in the form of the user device 130 implementing the application 135. FIG. 4 can, however, also be applied to the system explained with reference to FIGS. 1-2.

Initially, the user of the message communication device 130 creates a profile 165. The profile 165, is associated with or includes the availability indicator 170, and is stored by the server 180 to associate the availability indicator 170 with the user.

The user determines a predetermined distance that can be used by the status component 160. The predetermined distance will define the minimum distance that the user must be from the user device 130 to be considered away from the device.

When the user logs into the device 130 or manually changes the availability indicator 170, the device 130 sends the user input 140 to the status component 160. The status component updates the availability indicator 170 to indicate that the user is available at the device 130.

As shown in step S401, from time-to-time the server 180 receives the location signal 120.

Based on the location signal 120, the status component 160 calculates the distance between the user and the device 130.

In step S402, the status component 160 compares the distance between the user and the device 130 with the predetermined distance stored in the profile 165. If the distance is less than the predetermined distance, the user is determined to still be present at the device 130 and the process proceeds to step S403.

In step S403, the status component 160 leaves the availability indicator 170 unchanged. The availability indicator 170 continues to indicate that the user is available at the device 130.

If, in step S402, it is determined that the distance is greater than the predetermined distance stored in the profile 165, the user is determined to be away from the device 130 and the process proceeds to step S404.

In step S404, the status component 160 updates the availability indicator 170. The availability indicator 170 is set to indicate that the user is not available at device 130.

After steps S403 and S404, the process returns to step S401, and is executed again upon receipt of the next location signal 120.

The process illustrated in FIG. 4 is a process for changing the availability indicator 170 based on the location signal 120. This process can be configured to run only when the availability indicator 170 is in the available state, such that the availability indicator 170 will not automatically return to the available state when the user returns to within the predetermined distance. Otherwise, if the process is configured to run in the unavailable state, the availability indicator 170 will be set to the available state if the user returns to within the predetermined distance from the user device 130 while the availability indicator 170 is in the unavailable state. Other criteria can be used to determine the availability indicator 170. For example, the status component 160 could make a determination that the user is away if the mobile device 110 is not accessible by the same wireless network as the user device 130. Many other variations of establishing the user availability status based on location information are possible.

Figure 5:
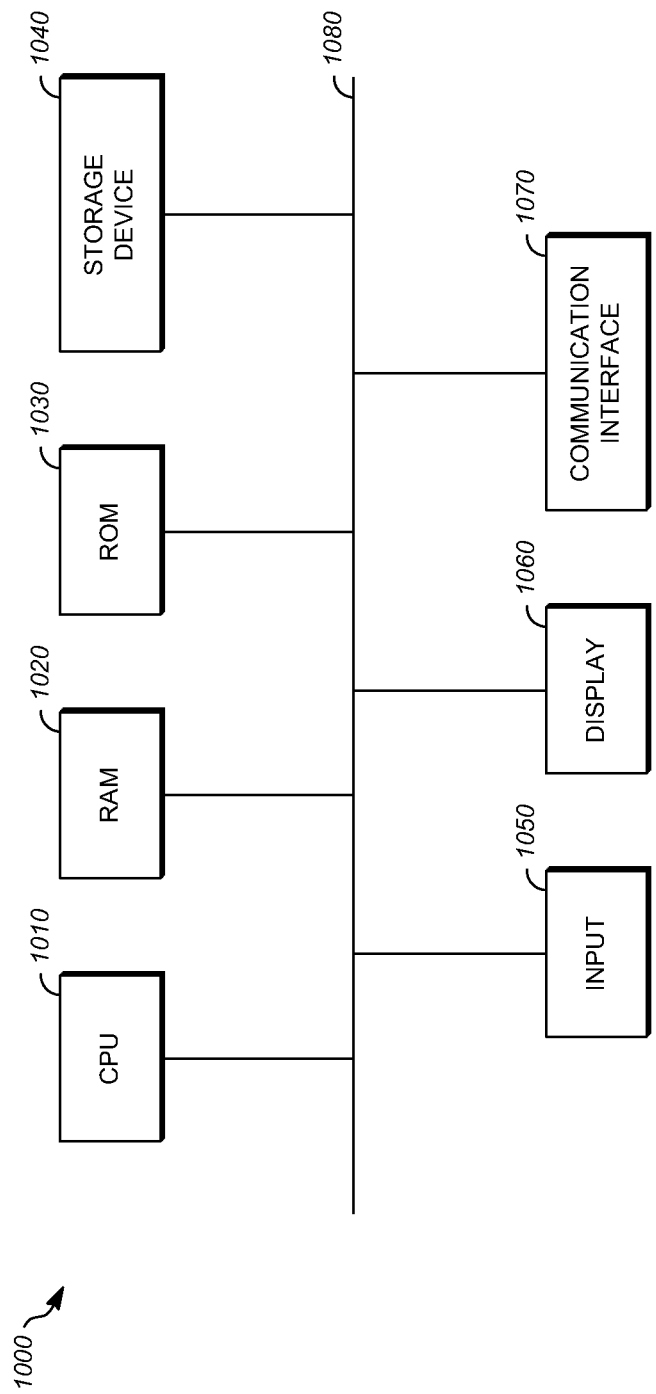
FIG. 5 is a block diagram showing a computer.

The device 30, user device 130, location service 115, the client-server 180 and the other user systems 190 can be implemented individually or in any combination in the form of software suitable for performing the processes detailed herein that is executed by a separate conventional computer 1000 as shown in FIG. 5. As an example, the computer 1000 includes a processor such as a central processing unit (CPU) 1010 and memory such as RAM 1020 and ROM 1030. Other types of processors can be used, including microcontrollers, digital signal processors, ASICs, special purpose computers, general purpose computers, or any other device or devices (whether singly or in multiple units) capable of processing information, and the term "processor" contemplates all such device or devices. A storage device 1040 can be provided in the form of any suitable computer readable medium, such as a hard disk drive. One or more input devices 1050, such as a keyboard and mouse, a touch screen interface, etc., allow user input to be provided to the CPU 1010. A display 1060, such as a liquid crystal display (LCD) or cathode ray tube (CRT), allows output to be presented to the user. A communications interface 1070 is a manner of wired or wireless means of communication that is operable to send and receive data or other signals using a network. The CPU 1010, the RAM 1020, the ROM 1030, the storage device 1040, the input devices 1050, the display 1060 and the communications interface 1070 are all connected to one another by a bus 1080.

Figure 6:
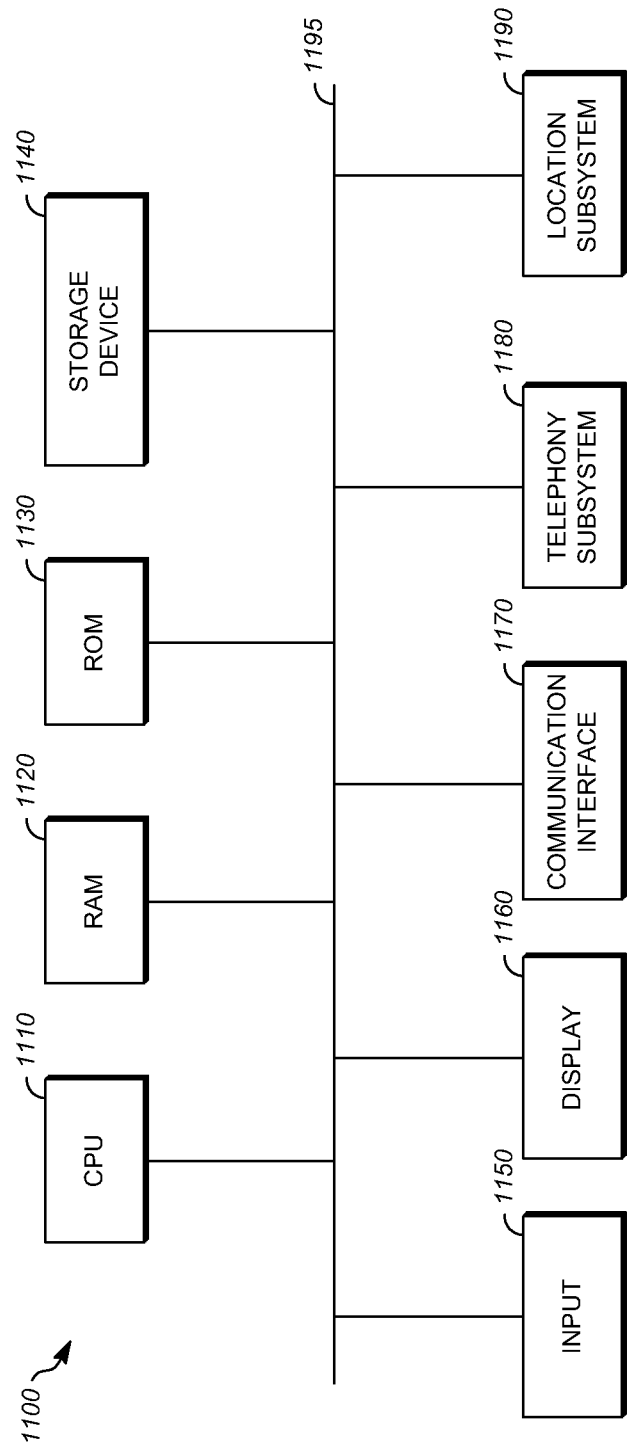
FIG. 6 is a block diagram showing a mobile device.

The mobile device 110 can be implemented in the form of a conventional cellular telephone 1100 as shown in FIG. 6. As an example, the cellular telephone 1100 includes a processor such as a central processing unit (CPU) 1110 and memory such as RAM 1120 and ROM 1130. A storage device 1140 can be provided in the form of any suitable computer readable medium, such as a hard disk drive. One or more input devices 1150, such as a keyboard and mouse, a touch screen interface, etc., allow user input to be provided to the CPU 1110. A display 1160, such as a liquid crystal display (LCD) or cathode ray tube (CRT), allows output to be presented to the user. A communications interface 1170 is any manner of wired or wireless means of communication that is operable to send and receive data or other signals using a network. A telephony subsystem 1180 provides functions necessary for placing and receiving telephone calls. A location subsystem 1190 is used to determine the physical location of the cellular telephone 1100, such as by latitude and longitude, using technologies such as the Global Positioning System (GPS). The CPU 1110, the RAM 1120, the ROM 1130, the storage device 1140, the input devices 1150, the display 1160, the communications interface 1170, the telephony subsystem 1180 and the location subsystem 1190 are all connected to one another by a bus 1195.

As previously noted, components of the systems described herein can be connected for communications with one another by networks. The communications functions described herein can be accomplished using any kind of network or communications means capable of transmitting data or signals. Suitable examples include the internet, which is a packet-switched network, a local area network (LAN), wide area network (WAN), virtual private network (VPN), or any other means of transferring data. A single network or multiple networks that are connected to one another can be used. It is specifically contemplated that multiple networks of varying types can be connected together and utilized to facilitate the communications contemplated by the systems and elements described in this disclosure.

The approaches herein are examples that have been described in order to allow easy understanding of the disclosed subject matter and do not limit the disclosed subject matter. On the contrary, the disclosed subject matter is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method, comprising:
   receiving, at one or more server computers from a communications device, availability information, wherein the availability information is based on user input received at the communications device;
   setting, at the one or more server computers and based on the availability information, a state for an availability indicator for the user to one of a first state that indicates that the user is available at the communications device and a second state that indicates that the user is not available at the communications device;
   transmitting, from the one or more server computers to one or more additional users, information regarding the state of the availability indicator; and
   subsequent to transmitting information regarding the state of the availability indicator:
      receiving, at the one or more server computers from a mobile device other than the communications device, a location signal that includes information indicative of the location of the mobile device,
      determining a distance between a physical location of the mobile device and a physical location of the communications device based on the location signal, and
      updating, at the one or more server computers, based on the distance between the physical location of the mobile device and the physical location of the communications device, the availability indicator, wherein updating the availability indicator comprises:
         responsive to determining that the distance satisfies a threshold condition, placing the availability indicator in the first state; and
         responsive to determining that the distance does not satisfy the threshold condition, placing the availability indicator in the second state.

2. The method of claim 1, wherein updating the availability indicator further comprises:
   automatically updating the availability indicator from the first state to the second state if the position of the mobile device relative to the communications device is determined to have changed from a position at the communications device to a position away from the communications device.

3. The method of claim 1, further comprising:
   transmitting, from the one or more server computers to one or more additional users and subsequent to updating the availability indicator based on the position of the mobile device relative to the communications device, information regarding the state of the availability indicator.

4. The method of claim 1, wherein the availability information is generated by a messaging application that is executed by the communications device and is operable to receive, from the one or more server computers, third-party availability information regarding the availability of one or more third-party users at one or more third-party user systems.

5. A storage device including program instructions executable by one or more processors that, when executed, cause the one or more processors to perform operations, the operations comprising:
   receiving, at one or more server computers from a communications device, availability information, wherein the availability information is based on user input received at the communications device;
   setting, at the one or more server computers and based on the availability information, a state for an availability indicator for the user to one of a first state that indicates that the user is available at the communications device and a second state that indicates that the user is not available at the communications device;
   transmitting, from the one or more server computers to one or more additional users, information regarding the state of the availability indicator; and
   subsequent to transmitting information regarding the state of the availability indicator:
      receiving, at the one or more server computers from a mobile device other than the communications device, a location signal that includes information indicative of the location of the mobile device,
      determining distance between a physical location of the mobile device and a physical location of the communications device based on the location signal, and
      updating, at the one or more server computers, based on the physical location of the mobile device and a physical location of the communications device, the availability indicator, wherein updating the availability indicator comprises:
         responsive to determining that the distance satisfies a threshold condition, placing the availability indicator in the first state; and
         responsive to determining that the distance does not satisfy the threshold condition, placing the availability indicator in the second state.

6. The storage device of claim 5, wherein updating the availability indicator further comprises:
   automatically updating the availability indicator from the first state to the second state if the position of the mobile device relative to the communications device is determined to have changed from a position at the communications device to a position away from the communications device.

7. The storage device of claim 5, further comprising:
   transmitting, from the one or more server computers to one or more additional users and subsequent to updating the availability indicator based on the position of the mobile device relative to the communications device, information regarding the state of the availability indicator.

8. The storage device of claim 5, wherein the availability information is generated by a messaging application that is executed by the communications device and is operable to receive, from the one or more server computers, third-party availability information regarding the availability of one or more third-party users at one or more third-party user systems.

9. An apparatus, comprising:
   one or more processors; and
   one or more memory devices for storing program instructions used by the one or more processors, wherein the program instructions, when executed by the one or more processors, cause the one or more processors to:
   receive, at one or more server computers from a communications device, availability information, wherein the availability information is based on user input received at the communications device;
   set, at the one or more server computers and based on the availability information, a state for an availability indicator for the user to one of a first state that indicates that the user is available at the communications device and a second state that indicates that the user is not available at the communications device;
   transmit, from the one or more server computers to one or more additional users, information regarding the state of the availability indicator; and subsequent to transmitting information regarding the state of the availability indicator:
receive, at the one or more server computers from a mobile device other than the communications device, a location signal that includes information indicative of the location of the mobile device,
determine a distance between a physical location of the mobile device and a physical location of the communications device based on the location signal, and
update, at the one or more server computers, based on the physical location of the mobile device and a physical location of the communications device, the availability indicator, wherein updating the availability indicator comprises:
responsive to determining that the distance satisfies a threshold condition, placing the availability indicator in the first state; and
responsive to determining that the distance does not satisfy the threshold condition, placing the availability indicator in the second state.

10. The apparatus of claim 9, wherein the program instructions cause the one or more processors to update the availability indicator by automatically updating the availability indicator from the first state to the second state if the position of the mobile device relative to the communications device is determined to have changed from a position at the communications device to a position away from the communications device.

11. The apparatus of claim 9, wherein the program instructions further cause the one or more processors to:
transmit, from the one or more server computers to one or more additional users and subsequent to updating the availability indicator based on the position of the mobile device relative to the communications device, information regarding the state of the availability indicator.

12. The apparatus of claim 9, wherein the availability information is generated by a messaging application that is executed by the communications device and is operable to receive, from the one or more server computers, third-party availability information regarding the availability of one or more third-party users at one or more third-party user systems.

* * * * *